(12) United States Patent
Mach et al.

(10) Patent No.: US 11,432,203 B2
(45) Date of Patent: Aug. 30, 2022

(54) METHOD AND APPARATUS FOR IMPROVING MOBILITY STATES OF A USER EQUIPMENT GROUP IN A WIRELESS COMMUNICATION SYSTEM

(71) Applicant: Samsung Electronics Co., Ltd., Suwon-si (KR)

(72) Inventors: Tomasz Mach, Middlesex (GB); Yue Wang, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/793,755

(22) Filed: Feb. 18, 2020

(65) Prior Publication Data
US 2020/0267603 A1 Aug. 20, 2020

(30) Foreign Application Priority Data
Feb. 18, 2019 (GB) ...................... 1902219

(51) Int. Cl.
*H04W 36/00* (2009.01)
*H04W 4/46* (2018.01)
*H04W 36/32* (2009.01)

(52) U.S. Cl.
CPC ......... *H04W 36/0009* (2018.08); *H04W 4/46* (2018.02); *H04W 36/32* (2013.01)

(58) Field of Classification Search
None
See application file for complete search history.

(56) References Cited

U.S. PATENT DOCUMENTS

| | | |
|---|---|---|
| 2014/0192781 A1 | 7/2014 | Teyeb et al. |
| 2015/0181480 A1 | 6/2015 | Bulakci et al. |
| 2016/0233947 A1 | 8/2016 | Shen et al. |
| 2019/0222367 A1* | 7/2019 | Tseng ...................... H04L 5/001 |
| 2019/0250621 A1* | 8/2019 | Ghannam ......... G08G 1/096716 |
| 2020/0092685 A1* | 3/2020 | Fehrenbach ......... H04B 7/2606 |
| 2020/0235887 A1* | 7/2020 | Hou ...................... H04W 24/02 |

FOREIGN PATENT DOCUMENTS

WO   2018/202797 A1   11/2018

OTHER PUBLICATIONS

"3rd Generation Partnership Project; Technical Specification Group Radio Access Network; NR; User Equipment (UE) procedures in Idle mode and RRC Inactive state (Release 15)", 3GPP TS 38.304 V15.2.0 (Dec. 2018), 28 pages.
Huawei, HiSilicon, "AS-related group communication for platooning", 3GPP TSG-RAN WG2 #105, Feb. 25-Mar. 1, 2019, R2-1902037, 3 pages.

(Continued)

*Primary Examiner* — Mohammad S Adhami (57) ABSTRACT

A method of managing a mobility state in a mobile telecommunication system, comprising the steps of: assigning a plurality of user equipments (UEs) to a group of UEs, wherein one of the plurality of UEs is a lead UE; determining a group mobility state based on certain parameters received from a base station (BS); and communicating the group mobility state to the other UEs in the group.

20 Claims, 8 Drawing Sheets

(56) References Cited

OTHER PUBLICATIONS

Notification of Transmittal of the International Search Report and the Written Opinion of the International Searching Authority, or the Declaration dated May 26, 2020 in connection with International Patent Application No. PCT/KR2020/002298, 9 pages.
"3rd Generation Partnership Project; Technical Specification Group Services and System Aspects; Enhancement of 3GPP support for V2X scenarios; Stage 1 (Release 15)", 3GPP TS 22.186 V15.2.0 (Sep. 2017), 16 pages.
"3rd Generation Partnership Project; Technical Specification Group Radio Access Network; Evolved Universal Terrestrial Radio Access (E-UTRA); User Equipment (UE) procedures in idle mode (Release 14)", 3GPP TS 36.304 714.6.0 (Mar. 2018), 50 pages.
"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.1.0 (Mar. 2018), 786 pages.
"3rd Generation Partnership Project; Technical Specification Group Radio Access Network; NR; Radio Resource Control (RRC) protocol specification (Release 15)", 3GPP TS 38.331 V15.4.0 (Dec. 2018), 474 pages.
Qualcomm Inc., "The path to 5G: Paving the road to tomorrow's autonomous vehicles", OnQ Blog, Jun. 7, 2016, 5 pages.
European Patent Office, "Supplementary European Search Report" dated Mar. 14, 2022, in connection with European Patent Application No. 20760051.1, 13 pages.
InterDigital Inc., "RAN2 Aspects of Groupcast Design," R2-1901581, 3GPP RAN WG2 Meeting #105, Athens, Greece, Feb. 25-Mar. 1, 2019, 2 pages.

\* cited by examiner

METHOD AND APPARATUS FOR IMPROVING MOBILITY STATES OF A USER EQUIPMENT GROUP IN A WIRELESS COMMUNICATION SYSTEM

CROSS-REFERENCE TO RELATED APPLICATIONS

This application is based on and claims priority under 35 U.S.C. § 119 to United Kingdom Patent Application No. 1902219.3 filed on Feb. 18, 2019 in the United Kingdom Intellectual Property Office, the disclosure of which is incorporated by reference herein in its entirety.

BACKGROUND

1. Field

The disclosure relates to a wireless communication system, and more particularly, to a method and apparatus for improving mobility states of a user equipment group in a wireless communication system.

2. Description of Related Art

To meet the soaring demand with respect to wireless data traffic because of the commercialization of $4^{th}$-generation (4G) communication systems, efforts have been made to develop improved $5^{th}$-generation (5G) communication systems or pre-5G communication systems. For this reason, 5G communication systems or pre-5G communication systems are also referred to as beyond-4G-network communication systems or post-long term evolution (LTE) systems. For higher data transmission rates, implementation of 5G communication systems in ultra-high frequency bands (mm-Wave) is being considered. In 5G communication systems, beamforming, massive multi-input multi-output (MIMO), full dimensional MIMO (FD-MIMO), array antenna, analog beamforming, and large-scale antenna technologies have been discussed as ways of alleviating propagation path loss and increasing propagation distances in ultra-high frequency bands. For system network improvement, in 5G communication systems, technologies such as evolved small cell, advanced small cell, cloud radio access network (RAN), ultra-dense network, device to device (D2D) communication, wireless backhaul, mobile network, cooperative communication, coordinated multi-points (CoMPs), and interference cancellation have been developed. Also, for 5G systems, other technologies have been developed, such as, hybrid frequency-shift keying (FSK) and quadrature amplitude modulation (QAM) modulation (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet, which is a human-oriented connectivity network where humans generate and consume information, is now evolving into the Internet of Things (IoT), where distributed entities, such as objects, exchange and process information. The Internet of Everything (IoE) has also emerged, which is a combination of IoT technology and Big Data processing technology through connection with a cloud server, etc. To implement the IoT, various technological elements, such as sensing technology, wired/wireless communication and network infrastructure, service interface technology, and security technology, are required, and recently technologies related to sensor networks for connecting objects, machine to machine (M2M), machine type communication (MTC), and so forth have been researched. Such an IoT environment may provide intelligent Internet technology (IT) services that create new value in human life by collecting and analyzing data generated among connected objects. IoT may be applied to a variety of fields including smart homes, smart buildings, smart cities, smart cars or connected cars, smart grids, health care, smart appliances, advanced medical services, and so forth through convergence and combination between existing IT and various industries.

Thus, various attempts have been made to apply 5G communication systems to IoT networks. For example, 5G communication technology such as a sensor network, M2M, MTC, etc., has been implemented by a scheme such as beamforming, MIMO, array antennas, and so forth. The application of cloud RAN as a Big Data processing technology may also be an example of the convergence of 3eG technology and IoT technology.

As described above, various services may be provided as mobile communication systems develop, and accordingly, ways of improving mobility states of a user equipment to smoothly provide such services are required.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

When the embodiments of the disclosure are described, technical matters that are well known in a technical field of the disclosure and are not directly related to the disclosure will not be described. By omitting an unnecessary description, the subject matter of the disclosure will be more clearly described without being obscured.

For the same reasons, some elements will be exaggerated, omitted, or simplified in the attached drawings. The size of each element does not entirely reflect the actual size of the element. In each drawing, an identical or corresponding element will be referred to as an identical reference numeral.

Advantages and features of the disclosure and a method for achieving them will be apparent with reference to embodiments of the disclosure described below together with the attached drawings. However, the disclosure is not limited to the disclosed embodiments of the disclosure, but may be implemented in various manners, and the embodiments of the disclosure are provided to complete the disclosure of the disclosure and to allow those of ordinary skill in the art to understand the scope of the disclosure. The disclosure is defined by the category of the claims. Throughout the specification, an identical reference numeral will indicate an identical element.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Meanwhile, it is known to those of ordinary skill in the art that blocks of a flowchart and a combination of flowcharts may be represented and executed by computer program instructions. These computer program instructions may also be stored in a general-purpose computer, a special-purpose computer, or a processor of other programmable data processing devices, such that the instructions implemented by the computer or the processor of the programmable data processing device produce a means for performing functions specified in the flowchart and/or block diagram block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks. The computer program instructions may also be loaded onto a computer or other programmable data processing apparatus to cause a series of operational steps to be performed on the computer or other programmable apparatus to produce a computer implemented process, such that the instructions that execute the computer or other programmable apparatus may provide steps for implementing the functions specified in the flowchart and/or block diagram block or blocks.

In addition, each block represents a module, segment, or portion of code, which includes one or more executable instructions for implementing the specified logical function(s). It should also be noted that in other implementations, the function(s) noted in the blocks may occur out of the order indicated. For example, two blocks shown in succession may, in fact, be executed substantially concurrently or the blocks may sometimes be executed in the reverse order, depending on the functionality involved.

In the current embodiment, the term '~unit', as used herein, denotes a software or hardware component, such as a field programmable gate array (FPGA) or application specific integrated circuit (ASIC), which performs certain tasks. However, the meaning of '~unit' is not limited to software or hardware. '~unit' may advantageously be configured to reside on the addressable storage medium and configured to reproduce one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and '~unit(s)' may be combined into fewer components and '~unit(s)' or further separated into additional components and '~unit(s)'. In addition, components and '~unit(s)' may be implemented to execute one or more CPUs in a device or a secure multimedia card.

A wireless communication system has evolved from an initial one that provides a voice-oriented service to a broadband wireless communication system that provides a high-speed and high-quality packet data service, like the communication standards, such as $3^{rd}$-Generation Partnership Project (3GPP) high speed packet access (HSPA), Long Term Evolution (LTE) or Evolved Universal Terrestrial Radio Access (E-UTRA), LTE-Advanced (LTE-A or E-UTRA Evolution), 3GPP2 high rate packet data (HRPD), Ultra Mobile Broadband (UMB), the Institute of Electrical and Electronics Engineers (IEEE) 802.16e, etc. As a $5^{th}$-generation (5G) wireless communication system, 5G or new radio (NR) communication standards have been established.

In a Rel-15 new radio (NR) system, to improve a coverage of an uplink (UL) data channel, in UL transmission of a terminal, pi/2 binary phase shift keying (BPSK) modulation having a lower peak-to-average power ratio (PAPR) than BPSK or quadrature phase shift keying (QPSK) having a fixed constellation may be applied. Meanwhile, in the Rel-15 NR system, QPSK is used for a UL demodulation reference signal (UL DM-RS), a PAPR of an orthogonal frequency division multiplexing (OFDM) symbol carrying the UL DM-RS becomes a bottleneck, making it difficult to expect substantial UL coverage improvement. To solve this problem, in Rel-16 NR, a pi/2 BPSK-based DMRS may be newly introduced. Pi/2 BPSK-based UL coverage improvement is not an essential factor for any network environment, and in particular, a Rel-15 terminal or base station may not understand a Rel-16 new RS sequence, using a function for properly selecting whether to configure pi/2 BPSK-based UL transmission or support the terminal. According to the disclosure, pi/2 BPSK-based UL RS transmission may be effectively indicated or determined depending on a channel or a procedure having an influence upon UL transmission such as a random access channel (RACH), a UL grant, etc.

Hereinbelow, the base station is an entity that performs resource assignment of the terminal, and may be at least one of gNode B, gNB, evolved Node B (eNode B), Node B, base station (BS), a wireless access unit, a base station controller, or a node on a network. The terminal may include a user equipment (UE), a mobile station (MS), a cellular phone, a smartphone, a computer, or a multimedia system capable of performing communication functions. While embodiments of the disclosure are described by using an NR system or a Long Term Evolution (LTE)/LTE-Advanced (LTE-A) system as an example, the embodiments of the disclosure may also be applied to other communication systems having a similar technical background or channel form. Also, the embodiments of the disclosure may also be applied to other communication systems through some modifications within a range that does not largely depart from the scope of the disclosure based on determination of a skilled person.

Figure 1:
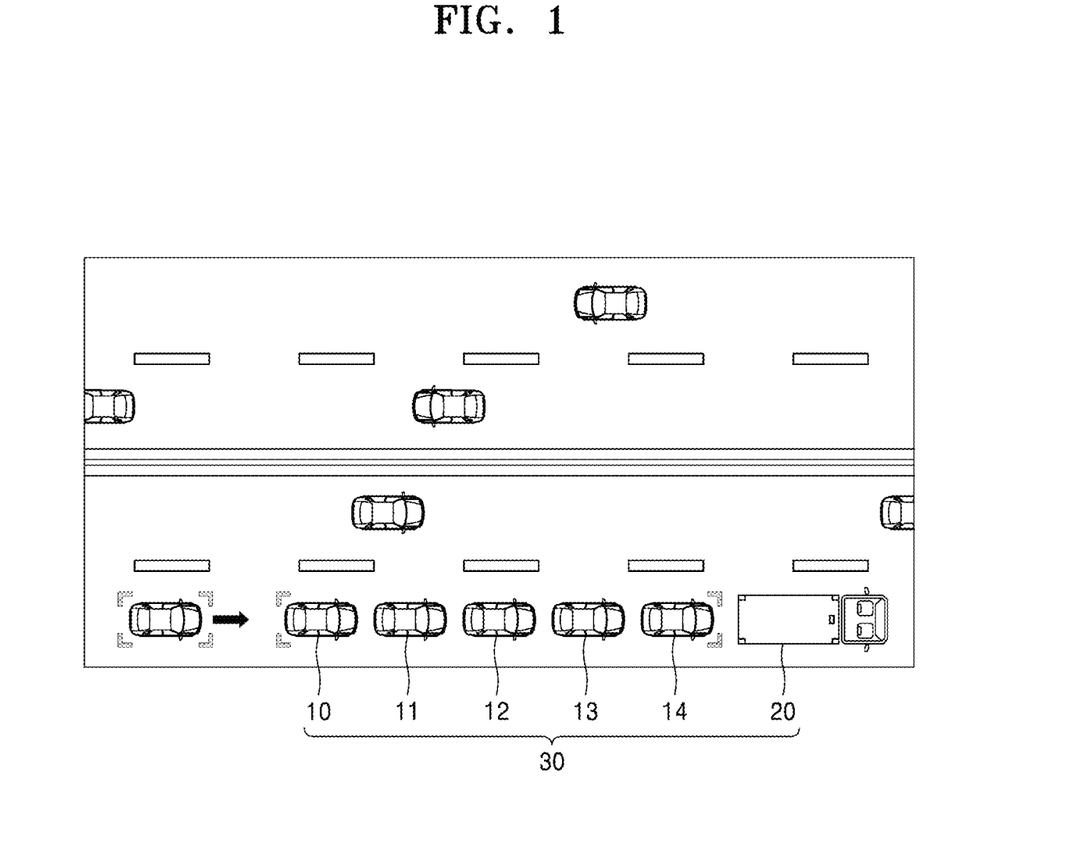
FIG. 1 illustrates a typical vehicular platoon.

FIG. 1 illustrates a typical vehicular platoon.

The disclosure relates to an improved mechanism for management of User Equipments (UEs) in a vehicular platoon. In the context of this application, a platoon is a number of vehicles that are travelling closely together and are electronically connected by a so-called electronic towbar. FIG. 1 shows a platoon 30. The lead vehicle 20 is followed by number of vehicles 10-14 matching its speed and maneuvers. Such platooning can reduce the distance between vehicles using electronic coupling/communication, based on Vehicle-to-Everything (V2X) techniques. It is typically possible to decrease the distance between vehicles to the order of 5 m.

It should be noted that a platoon is only one example of a group of UEs and other grouping arrangements are possible. References to 'platoon' should be interpreted as examples only.

There are two different wireless technologies are considered for V2X communication, used by the vehicle platoon. The first is Cellular V2X (C-V2X) based on 3GPP LTE or New Radio (NR) systems using short range, direct Vehicle to Vehicle (V2V) PC5 interface (known as sidelink) or Vehicle to Network/Infrastructure (V2N/I) Uu interface. In C-V2X, User Equipment (UE) typically installed in a vehicle implements an external connectivity function to support Cooperative Intelligent Transport Systems (C-ITS) applications. The second technology is ITS-G5/IEEE 802.11p (known as DSRC).

Figure 2:
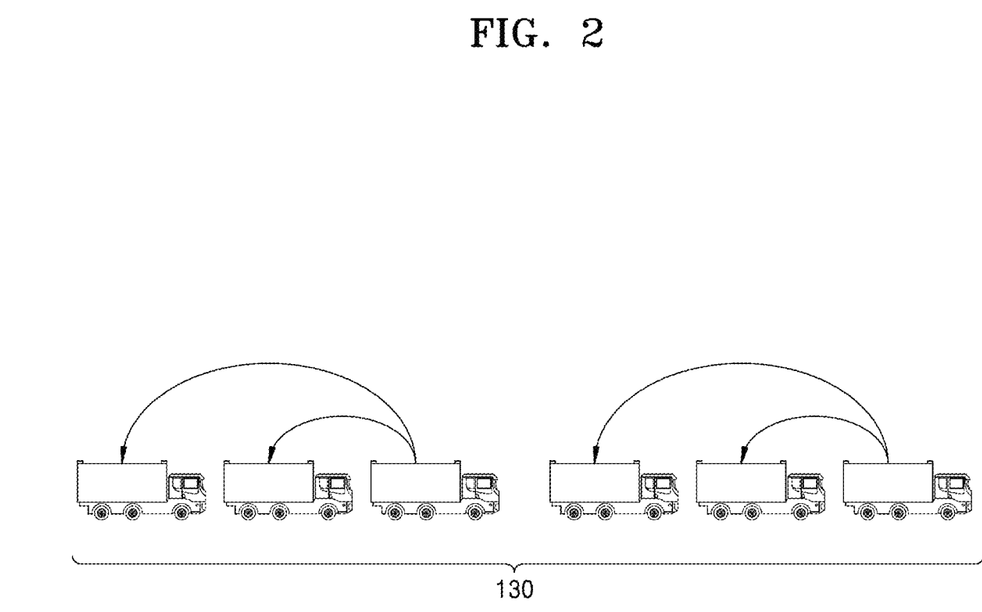
FIG. 2 illustrates a typical vehicular platoon using distributed control.

The First vehicle 20 is driven manually or automatically. The following vehicles 10-14 are controlled both laterally and longitudinally based on available sensor information. Platoon control may be centralized in the first vehicle 20 or distributed as indicated in FIG. 2, where the platoon 130 comprises six vehicles, with control being exercised as indicated by the arrows between respective vehicles.

However, it is expected that practical platoon implementations will use centralized control as shown in FIG. 1. Platoon control and coordination between vehicles (V2V) may use C-V2X PC5 or ITS-G5/IEEE 802.11p interface, as required. Platoon control, configuration and support functions may also be performed remotely using a back office application such as via C-V2X Uu interface.

Platoon configuration may be dynamically changed, such as by a vehicle joining or leaving. Platooning allows an increase in a given road's capacity and safety, while also decreasing congestion and fuel consumption.

High-density platooning is an enhancement to general platooning techniques whereby self-driving or autonomous vehicles communicate to create a closely spaced multiple vehicle chain on a highway. This can further reduce a distance between vehicles down to 1 m.

3GPP LTE RRC (Radio Resource Control) protocol defines three different mobility states (normal, medium, high) and further defines transitions between them. Mobility states are used to improve UE mobility performance during cell handover by scaling handover parameters. This means that a decision to change cell is made faster in higher mobility states. Mobility state is further shared with the network (NW) during UE network access (RRC signaling connection establishment) to support Radio Resource Management algorithms e.g. handover to larger (macro) cell.

Mobility state change is triggered when the number of cell changes during a predefined time period is higher than a predefined threshold.

3GPP defines the 'mobility states' of a UE, where the states are decided by the UE, based on five parameters (TCRmax, NCR_H, NCR_M, TCRmaxHyst and cellEquivalentSize) broadcasted via system information of the servicing cell. Note that these are the parameters used by the UE to decide on its mobility state, indicating an overhead of additional signaling (approximately 20 bytes).

Previously, every UE, individually, follows a defined protocol to update its mobility state in a given time period.

It is an aim of embodiments of the disclosure to address shortcomings in current protocols for mobility states, whether mentioned herein or not.

According to the disclosure there is provided an apparatus and method as set forth in the appended claims. Other features of the present disclosure will be apparent from the dependent claims, and the description which follows.

According to a first aspect of the disclosure, there is provided a method of managing mobility state in a mobile telecommunication system, comprising the steps of: assigning a plurality of User Equipments, UEs, to a group of UEs wherein one of the plurality of UEs is a lead UE; the lead UE determining a group mobility state on the basis of certain parameters received from a Base Station, BS; the lead UE communicating the group mobility state to the other UEs in the group. In an embodiment, the group of UEs is a platoon.

In an embodiment, the step of the lead UE communicating the group mobility state comprises the use of a different communication channel to a communication channel with which communications with the BS are conducted.

In an embodiment, a short range, direct vehicle to vehicle, V2V, interface is used to communicate group mobility state to the other UEs in the platoon.

In an embodiment, the step of the lead UE determining the group mobility states comprises determining if a number of cell reselections exceeds a first predefined threshold and, if so, determining the group mobility state to be 'group high mobility'.

In an embodiment, if the number of cell reselections does not exceed a first predefined threshold but exceeds a second predefined threshold, determining the group mobility state to be 'group medium mobility'.

According to a second aspect of the disclosure, there is provided a non-transitory data carrier carrying control code to implement the method of the first aspect.

According to a third aspect of the disclosure, there is provided apparatus arranged to perform the method of the first aspect.

Although various embodiments of the disclosure have been shown and described, it will be appreciated by those skilled in the art that various changes and modifications might be made without departing from the scope of the present disclosure, as defined in the appended claims.

For a better understanding of the disclosure, and to show how embodiments of the same may be carried into effect, reference will now be made, by way of example only, to the accompanying diagrammatic drawings.

Figure 3:
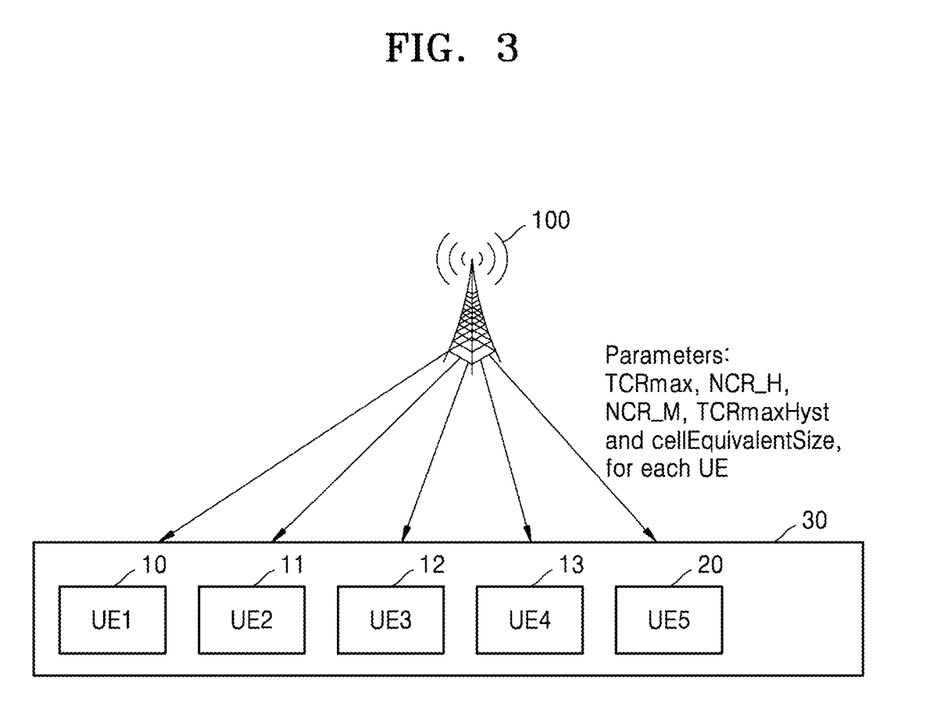
FIG. 3 illustrates a representation of signaling between UEs in a platoon and a base station.

FIG. 3 illustrates a representation of signaling between UEs in a platoon and a base station.

FIG. 3 shows a platoon 30 comprising lead vehicle 20 and four further vehicles 10-13. In some mobility state protocols, each UE decides its own mobility state on the basis of the parameters as shown, received from BS 100.

In other mobility state protocols, handling mobility states for each UE/vehicle in a platoon increases the signaling overhead and complexity. Further, since each UE is responsible for its own mobility state, this can increase complexity and increase a signaling overhead. Still further, there is a risk that different UEs in a given platoon may use different serving cells. This can result in decreased platoon application performance and could, in some instances, reduce road safety. In contrast, an embodiment of the disclosure defines a "group mobility state" which relates to a plurality of vehicles in a platoon configuration. This is illustrated in FIG. 4 which shows an arrangement according to an embodiment of the disclosure.

Figure 4:
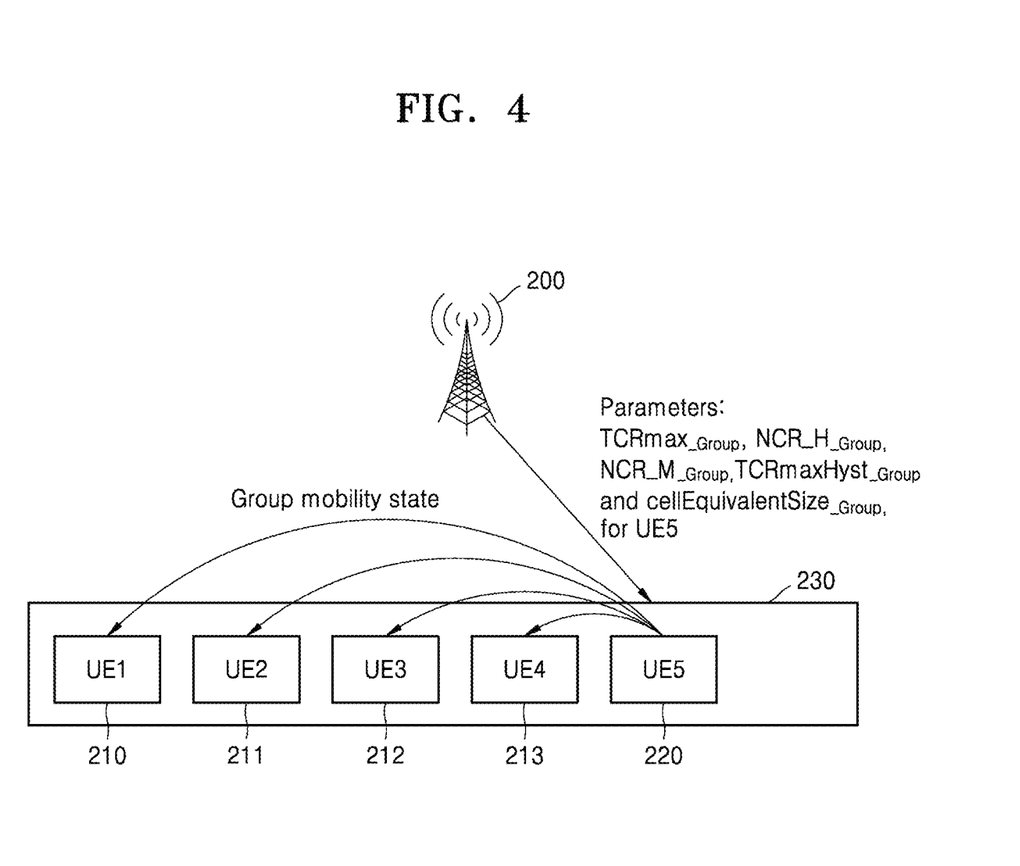
FIG. 4 illustrates a representation of signaling between UEs in a platoon and a base station.

FIG. 4 illustrates a representation of signaling between UEs in a platoon and a base station.

Here, there is shown a base station 200 which is in communication with a number of UEs in a multi-vehicle platoon 230. The lead vehicle 220 is followed by further vehicles, or UEs, 210-213.
The lead vehicle 220 receives parameters from the BS 200. The parameters received are described later.

The lead vehicle 220 is able to communicate with the other vehicles 210-213 using a sidelink (PC5) interface, which is available for direct vehicle UE to vehicle UE communication. In this way, the mobility state of the group is determined only by the lead vehicle 220, which then communicates the group mobility state to each other vehicle in the platoon 230 by means of the PC5 interface. Other direct, short range V2V interfaces are known and PC5 is an example only.

By this means, air interface traffic and system complexity is reduced. The mobility of the entire platoon 230 is also improved as cells are traversed.

Reference was made earlier to various parameters used in order to define and manage group mobility state. The group mobility state can include a normal mobility state, a high mobility state and a medium mobility state, according to an embodiment of the disclosure.

Parameters, and typical values, used by the lead vehicle 220, and transmitted from BS 200 include:
$T_{CRmax\_Group}$—Predefined time period e.g. 120 seconds
$N_{CR\_H\_Group}$—Number of cell reselections for UE group to enter High mobility state e.g. 6
$N_{CR\_M\_Group}$—Number of cell reselections for UE group to enter Medium mobility state e.g. 3
$T_{CRmaxHyst\_Group}$—Predefined time hysteresis period e.g. 180 seconds The parameters above are transmitted from the BS 200 in a system information broadcast or during RRC signaling connection establishment from the serving cell. In the latter case, this may be in the form of dedicated signaling to the group or platoon leader If a number of cell changes (e.g. reselections or handovers) during time period $T_{CRmax\_Group}$ exceeds $N_{CR\_M\_Group}$ but does not exceed $N_{CR\_H\_Group}$, then the platoon 230 should enter Medium-mobility state.

If a number of cell changes (e.g. reselections or handovers) during time period $T_{CRmax\_Group}$ exceeds $N_{CR\_H\_Group}$, then the platoon should enter High-mobility state.

If the criteria for either Medium- or High-mobility state are not detected during time period $T_{CRmaxHyst\_Group}$, then the platoon should enter Normal-mobility state.

The above definitions illustrate the boundaries which define the three possible mobility states and how these are determined at the lead vehicle 220 and subsequently transmitted to the remaining vehicles in the platoon. If further granularity is used, in possible future applications, then additional mobility states may be defined as desired.

To make the cell change decision more rapidly, if medium or high mobility state is detected in the platoon 230, then the following two parameters provided by the network may be defined and scaled as defined by scaling rules in 3GPP TS 36.304 V14.6.0 (2018-03) section 5.2.4.3.1
Speed dependent ScalingFactor for $Q_{hyst}$ (measured cell power or quality domain cell change hysteresis parameter) for medium or high mobility state
Speed dependent ScalingFactor for $T_{reselection}$ (time domain cell change hysteresis parameter) for medium or high mobility state FIGS. 3 and 4 illustrate the difference between other mechanisms for mobility states of the UEs, compared to an embodiment of the disclosure. In particular, in other mechanisms, every UE receives the mobility states dependent parameters, in order to decide on its own mobility state, then make decisions on further cell selection/reselection according to its mobility state.

In contrast, in an embodiment of the disclosure, only the lead vehicle 220 of the platoon receives such information, make the decision according to the information received, and to inform the other UEs 210-213 of its decision through PC5 interfaces.

Figure 5:
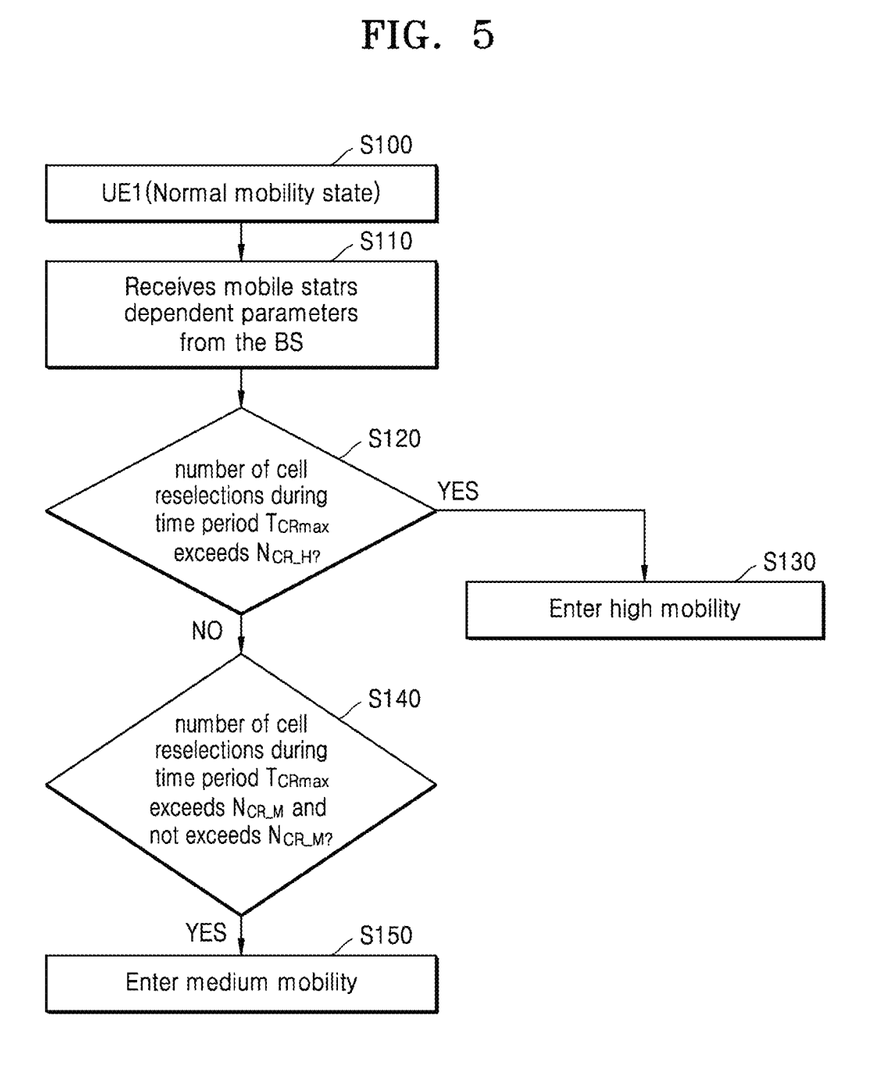
FIG. 5 illustrates a flowchart indicating how a UE decides its mobility state.

FIG. 5 illustrates a flowchart indicating how a UE decides its mobility state. FIG. 5 shows a flowchart illustrating the procedures that each UE performs in deciding the mobility states, according to other mechanisms for detecting a mobility state.

Here, the starting point S100 assumes that UE1 (10-13, 20) is in normal mobility state. At step S110, it receives parameters from BS 100. At step S120, a determination is made if a high mobility state should be entered (S120). This is entered if a number of cell reselections exceeds a defined threshold (S130). If the threshold is not exceeded, then a determination is made in step S140 if a different threshold has been exceeded. If so, the UE enters a state of medium mobility (S150).

Figure 6:
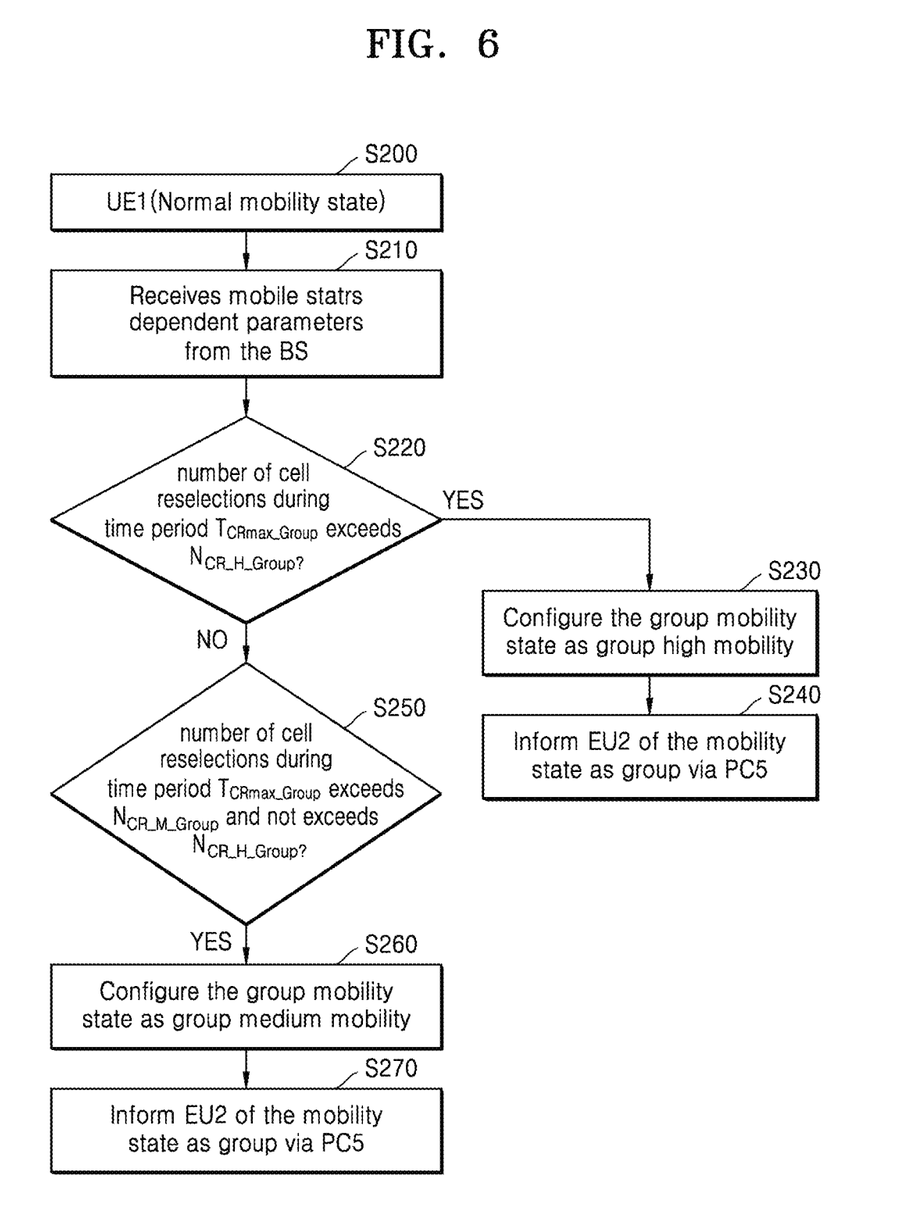
FIG. 6 illustrates a flowchart indicating how a UE decides its mobility state.

In contrast, FIG. 6 shows a flowchart illustrating a method according to an embodiment of the disclosure. This assumes that there are two vehicles in the platoon, with UE1 as the lead vehicle.

At state S200, UE1 (the lead UE/vehicle) is assumed to be in normal mobility state. At step S210, it received certain parameters from BS 200. At step S220, a number of cell reselections is determined and if this exceeds a defined threshold, then at step S230, UE1 configures the group mobility to be high mobility. At step S240, UE1 informs UE2 of the new group mobility state via the PC5 or sidelink interface. Any suitable interface can be used for this communication.

At step S250, if the first threshold is not exceeded, a determination is made whether the number of cell reselections exceeds a second threshold. If so, at step S260, the group mobility state is set to medium mobility. At step S270, UE1 informs UE2 of the new group mobility state, exactly as in step S240.

Figure 7:
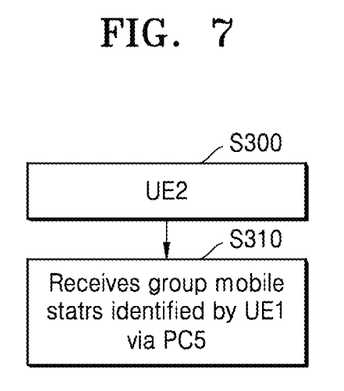
FIG. 7 illustrates how UEs (other than the leader) in a platoon decide on their mobility state.

FIG. 6 illustrates a flowchart indicating how a UE decides its mobility state, and FIG. 7 illustrates how UEs (other than the leader) in a platoon decide on their mobility state. FIG. 7 shows a flowchart which represents steps S240 and S270 in FIG. 6. Here, it is illustrated what happens at UE2 (S300). UE1 is the leader, while UE2 is in the group. Note that there may be a plurality of other UEs in the group. One is shown for simplicity of explanation.

Here, UE2 receives the new group mobility state via PC5 from UE1 (S310). UE1 has sole responsibility for determining the group mobility state and the other UEs in the group merely receive this information.

It is understood that although the drawings include the description of the 'mobility state' detection, other actions (e.g. cell reselection which may use 'the mobility state') for a group of UEs with similar behavior (e.g. speed), can be performed by the group leader and the result of the decision (e.g., to switch to another cell) can be informed to the other UEs in the group via PC5, following the similar protocol given in FIG. 6.

Figure 8:
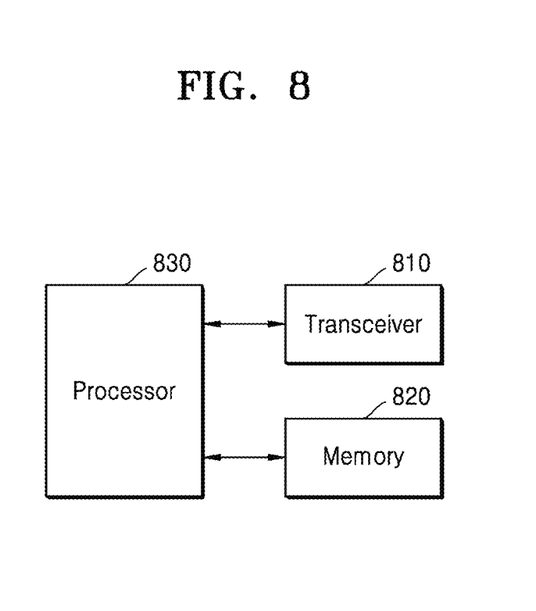
FIG. 8 is a block diagram illustrating an internal structure of a UE, according to embodiments of the disclosure.

FIG. 8 illustrates a user equipment (UE) according to embodiments of the present disclosure.

Referring to the FIG. 8, the UE 800 may include a processor 830, a transceiver 810 and a memory 820. However, all of the illustrated components are not essential. The UE 800 may be implemented by more or less components than those illustrated in FIG. 8. In addition, the processor 830 and the transceiver 810 and the memory 820 may be implemented as a single chip according to another embodiment.

The aforementioned components will now be described in detail.

The processor 830 may include one or more processors or other processing devices that control the proposed function, process, and/or method. Operation of the UE 800 may be implemented by the processor 830.

The transceiver 810 may include a RF transmitter for up-converting and amplifying a transmitted signal, and a RF receiver for down-converting a frequency of a received signal. However, according to another embodiment, the transceiver 810 may be implemented by more or less components than those illustrated in components.

The transceiver 810 may be connected to the processor 830 and transmit and/or receive a signal. The signal may include control information and data. In addition, the transceiver 810 may receive the signal through a wireless channel and output the signal to the processor 830. The transceiver 810 may transmit a signal output from the processor 830 through the wireless channel. The memory 820 may store the control information or the data included in a signal obtained by the UE 800. The memory 820 may be connected to the processor 830 and store at least one instruction or a protocol or a parameter for the proposed function, process, and/or method. The memory 820 may include read-only memory (ROM) and/or random access memory (RAM) and/or hard disk and/or CD-ROM and/or DVD and/or other storage devices.

Figure 9:
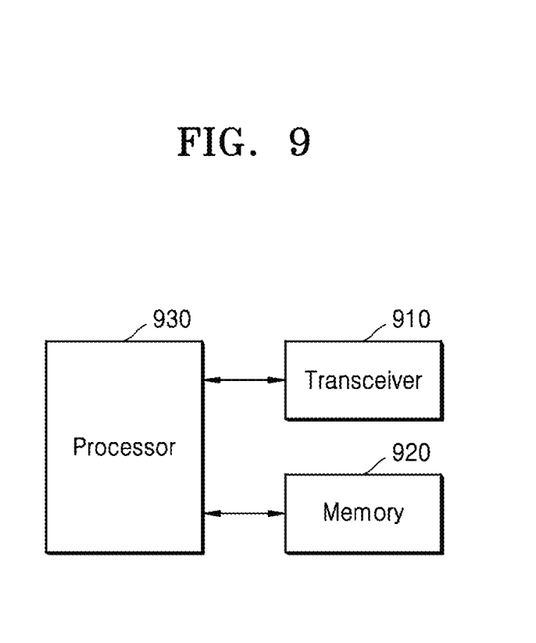
FIG. 9 is a block diagram illustrating an internal structure of a base station (BS) according to embodiments of the disclosure.

FIG. 9 illustrates a block diagram of a base station (BS) according to embodiments of the present disclosure.

Referring to the FIG. 9, the BS 900 may include a processor 930, a transceiver 910 and a memory 920. However, all of the illustrated components are not essential. The BS 900 may be implemented by more or less components than those illustrated in FIG. 9. In addition, the processor 930 and the transceiver 910 and the memory 920 may be implemented as a single chip according to another embodiment.

The aforementioned components will now be described in detail.

The processor 930 may include one or more processors or other processing devices that control the proposed function, process, and/or method. Operation of the BS 900 may be implemented by the processor 930.

The transceiver 910 may include a RF transmitter for up-converting and amplifying a transmitted signal, and a RF receiver for down-converting a frequency of a received signal. However, according to another embodiment, the transceiver 910 may be implemented by more or less components than those illustrated in components.

The transceiver 910 may be connected to the processor 930 and transmit and/or receive a signal. The signal may include control information and data. In addition, the transceiver 910 may receive the signal through a wireless channel and output the signal to the processor 930. The transceiver 910 may transmit a signal output from the processor 930 through the wireless channel. The memory 920 may store the control information or the data included in a signal obtained by the BS 900. The memory 920 may be connected to the processor 930 and store at least one instruction or a protocol or a parameter for the proposed function, process, and/or method. The memory 920 may include read-only memory (ROM) and/or random access memory (RAM) and/or hard disk and/or CD-ROM and/or DVD and/or other storage devices.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) for managing a mobility state in a mobile communication system, the method comprising:
   receiving, from a base station (BS), parameters including information determining a group mobility state;
   assigning a plurality of UEs to a group of UEs, wherein the UE is identified as a lead UE;
   determining whether a number of cell reselections during time period $T_{CRmax,Group}$ exceeds $N_{CR\_H,Group}$;
   configuring the group mobility state as a group high mobility state based on a determination that the number of cell reselections exceeds $N_{CR\_H,Group}$, or the group mobility state as a group medium mobility state based on a determination that the number of cell reselections does not exceed $N_{CR\_H,Group}$;
   receiving a speed dependent scaling factor $T_{reselection}$ for the group mobility state; and
   informing, by the lead UE, the group mobility state and the speed dependent scaling factor $T_{reselection}$ to the group of UEs.

2. The method of claim 1 wherein the group of UEs is a platoon.

3. The method of claim 2, further comprising using a communication channel that is a different communication channel used for the BS.

4. The method of claim 3, wherein a short range communication comprises a direct vehicle to vehicle (V2V) interface is used to communicate the group mobility state to the group of UEs in the platoon.

5. The method of claim 1, further comprising:
   determining whether a number of cell reselections exceeds a first predefined threshold; and
   determining the group mobility state as a group high mobility state based on a determination that the number of cell reselections exceeds the first predefined threshold.

6. The method of claim 5, further comprising determining the group mobility state as a group medium mobility state based on a determination that the number of cell reselections does not exceed the first predefined threshold.

7. A method performed by a base station (BS) for managing a mobility state in a mobile communication system, the method comprising:
   assigning a plurality of user equipments (UEs) to a group of UEs, wherein one of the plurality of UEs is identified as a lead UE;
   transmitting, to the lead UE, parameters including information determining a group mobility state; and
   transmitting a speed dependent scaling factor $T_{reselection}$ for the group mobility state,
   wherein:
      the group mobility state is determined as a group high mobility state based on a determination that a number of cell reselections exceeds $N_{CR\_H,Group}$, or the group mobility state is determined as a group medium mobility state based on a determination that the number of cell reselections does not exceed $N_{CR\_H,Group}$, and
      the group mobility state and the speed dependent scaling factor $T_{reselection}$ are informed, by the lead UE, to the group of UEs.

8. The method of claim 7, wherein the group of UEs is a platoon.

9. The method of claim 8, wherein a communication channel used for the group mobility state is a different than a communication channel that is used to communicate between the lead UE and the plurality of UEs.

10. The method of claim 9, wherein a short range communication comprises a direct vehicle to vehicle (V2V) interface is used to communicate group mobility state to the group of UEs in the platoon.

11. The method of claim 7, further comprising:
    determining whether a number of cell reselections exceeds a first predefined threshold; and
    determining the group mobility state as a group high mobility state based on a determination that the number of cell reselections exceeds the first predefined threshold.

12. The method of claim 11, further comprising determining the group mobility state as a group medium mobility state based on a determination that the number of cell reselections does not exceed the first predefined threshold.

13. A user equipment (UE) comprising:
a transceiver configured to receive, from a base station (BS), parameters including information determining a group mobility state; and
a processor operably coupled to the transceiver, the processor configured to:
assign a plurality of UEs to a group of UEs, wherein the UE is identified as a lead
determine whether a number of cell reselections during time period $T_{CRMax,Group}$ exceeds $N_{CR\_H,Group}$,
configure the group mobility state as a group high mobility state based on a determination that the number of cell reselections exceeds $N_{CR\_H,Group}$, or the group mobility state as a group medium mobility state based on a determination that the number of cell reselections does not exceed $N_{CR\_H,Group}$,
receive a speed dependent scaling factor $T_{reselection}$ for the group mobility state, and
inform, by the lead UE, the group mobility state and the speed dependent scaling factor $T_{reselection}$ to the group of UEs.

14. The UE of claim 13, wherein the group of UEs is a platoon.

15. The UE of claim 14, wherein the processor is further configured to communicate to the group mobility state, and wherein a communication channel used for the group mobility state is different than a communication channel that is used to communicate with the BS.

16. The UE of claim 15, wherein the transceiver is further configured to perform a short range communication comprising a direct vehicle to vehicle (V2V) interface that is used to communicate the group mobility state to the group of UEs in the platoon.

17. The UE of claim 13, wherein the processor is further configured to:
determine whether a number of cell reselections exceeds a first predefined threshold, and
determine the group mobility state as a group high mobility state based on a determination that the number of cell reselections exceeds the first predefined threshold.

18. The UE of claim 17, wherein the processor is further configured to determine the group mobility state as a group medium mobility state based on a determination that the number of cell reselections does not exceed the first predefined threshold.

19. A base station (BS) comprising:
a transceiver configured to transmit parameters including information determining a group mobility state; and
a processor operably coupled to the transceiver, the processor configured to:
assign a plurality of user equipments (UEs) to a group of UEs, wherein one of the plurality of UEs is identified as a lead UE, and
transmit a speed dependent scaling factor $T_{reselection}$ for the group mobility state,
wherein:
the group mobility state is determined as a group high mobility state based on a determination that a number of cell reselections exceeds $N_{CR\_H,Group}$, or the group mobility state is determined as a group medium mobility state based on a determination that the number of cell reselections does not exceed $N_{CR\_H,Group}$, and
the group mobility state and the speed dependent scaling factor $T_{reselection}$, are informed by the lead UE, to the group of UEs.

20. The BS of claim 19, wherein the processor is further configured to:
determine whether a number of cell reselections exceeds a first predefined threshold;
determine the group mobility state as a group high mobility state based on a determination that the number of cell reselections exceeds the first predefined threshold; and
determine the group mobility state as a group medium mobility state based on a determination that the number of cell reselections does not exceed the first predefined threshold.

* * * * *

UNITED STATES PATENT AND TRADEMARK OFFICE
CERTIFICATE OF CORRECTION

| | |
|---|---|
| PATENT NO. | : 11,432,203 B2 |
| APPLICATION NO. | : 16/793755 |
| DATED | : August 30, 2022 |
| INVENTOR(S) | : Tomasz Mach et al. |

It is certified that error appears in the above-identified patent and that said Letters Patent is hereby corrected as shown below:

On the Title Page

Item [30] delete "(GB) 1902219" and insert -- (GB) 1902219.3 --.

Signed and Sealed this
Third Day of January, 2023

Katherine Kelly Vidal
*Director of the United States Patent and Trademark Office*